(12) United States Patent
Krzywon

(10) Patent No.: US 11,530,027 B2
(45) Date of Patent: Dec. 20, 2022

(54) PROPELLER CONTROL UNIT WITH BYPASS DRAIN LINE

(71) Applicant: PRATT & WHITNEY CANADA CORP., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 227 days.

(21) Appl. No.: 16/700,259

(22) Filed: Dec. 2, 2019

(65) Prior Publication Data

US 2021/0164403 A1 Jun. 3, 2021

(51) Int. Cl.
*B64C 11/38* (2006.01)

(52) U.S. Cl.
CPC ............ *B64C 11/385* (2013.01); *B64C 11/38* (2013.01); *F05D 2260/406* (2013.01); *F05D 2260/74* (2013.01); *F05D 2260/79* (2013.01)

(58) Field of Classification Search
CPC ........... F05D 2260/406; F05D 2260/74; F05D 2260/79; F05D 2220/324; B64C 11/38; B64C 11/385; F01D 7/00; F15B 9/10; F15B 2211/611; F02C 6/206; F02C 9/58
See application file for complete search history.

(56) References Cited

U.S. PATENT DOCUMENTS

| | | | |
|---|---|---|---|
| 5,174,718 A | 12/1992 | Lampeter | |
| 2013/0280065 A1* | 10/2013 | Danielson | B64C 11/38 416/1 |
| 2016/0207609 A1 | 7/2016 | Belmonte et al. | |
| 2017/0066523 A1 | 3/2017 | Miszkiewicz | |
| 2017/0361919 A1* | 12/2017 | Waddleton | F04D 29/325 |
| 2018/0043991 A1 | 2/2018 | Tajan et al. | |
| 2018/0072402 A1* | 3/2018 | Waddleton | B64C 11/38 |
| 2019/0031319 A1 | 1/2019 | Calkins et al. | |
| 2019/0092453 A1 | 3/2019 | Hoemke et al. | |

FOREIGN PATENT DOCUMENTS

| | | |
|---|---|---|
| EP | 2807079 | 12/2014 |
| EP | 3293109 | 3/2018 |
| GB | 887123 | 1/1962 |

OTHER PUBLICATIONS

Extended European Search Report, EP20211346.0, dated Apr. 5, 2021.

* cited by examiner

*Primary Examiner* — Brian P Wolcott
*Assistant Examiner* — Jesse M Prager
(74) *Attorney, Agent, or Firm* — Norton Rose Fubright Canada LLP

(57) ABSTRACT

A propeller control unit (PCU) has: a pitch angle actuator; a valve operable to selectively fluidly connect the pitch angle actuator with a source of oil for controlling pitch angles of blades of a propeller and with a drain line for draining oil out of the pitch angle actuator for feathering the blades; and a bypass line having an inlet hydraulically between the valve and an inlet of the drain line, the bypass line having an outlet hydraulically between the inlet of the drain line and an outlet of the drain line.

16 Claims, 5 Drawing Sheets

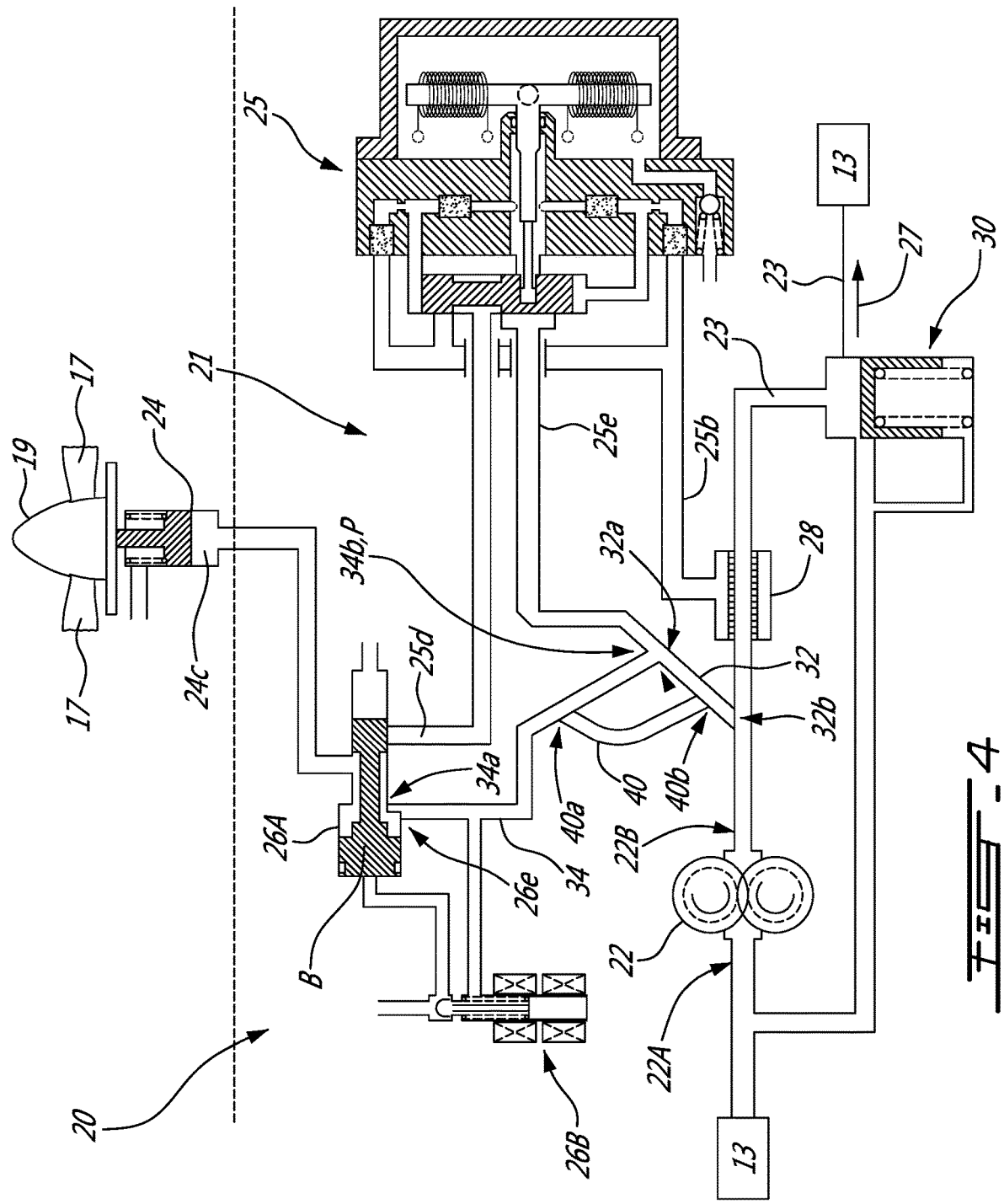

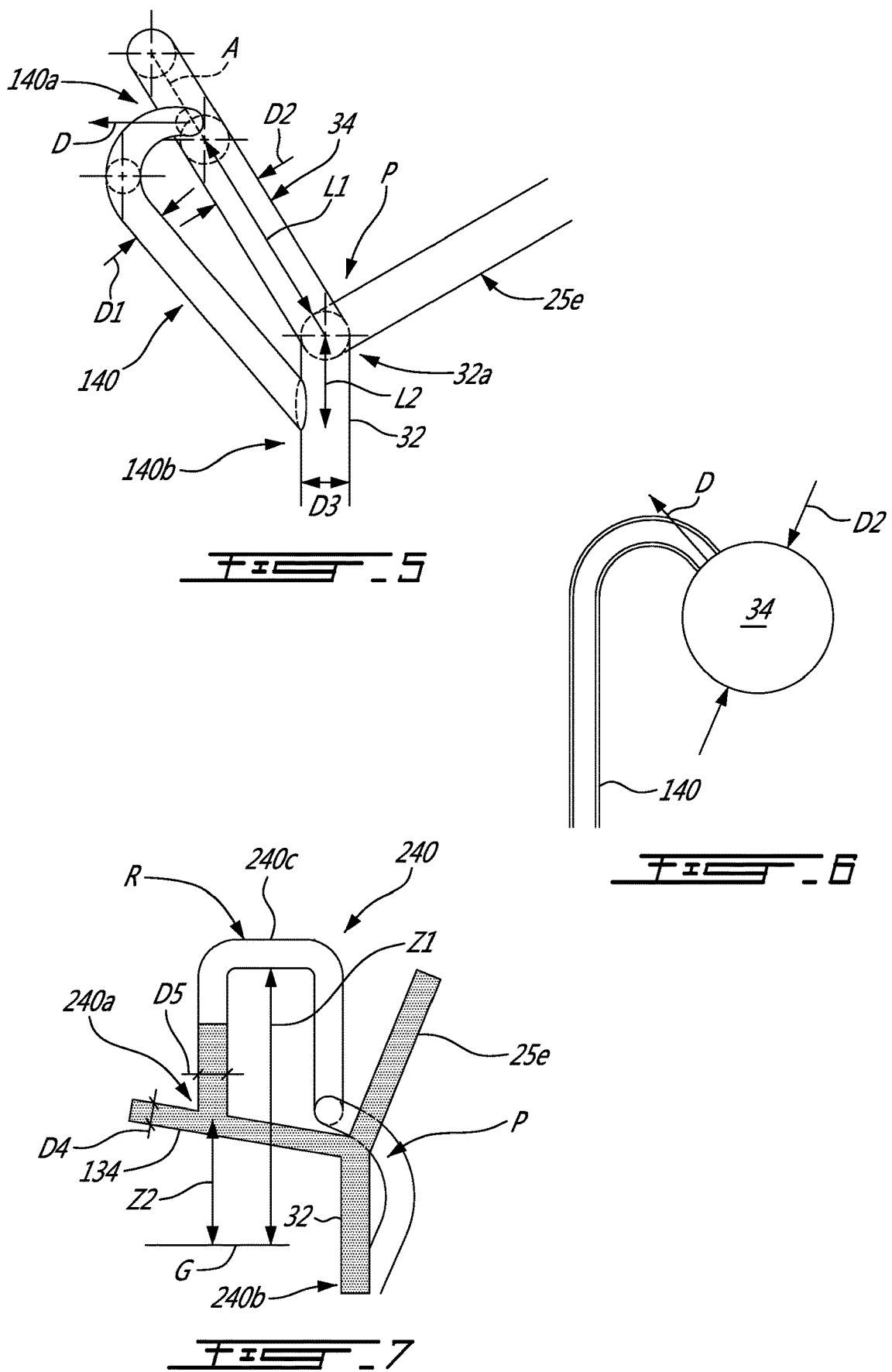

PROPELLER CONTROL UNIT WITH BYPASS DRAIN LINE

TECHNICAL FIELD

The application relates generally to turboprop gas turbine engines and, more particularly, to oil systems for such turboprop engines.

BACKGROUND OF THE ART

Turboprop gas turbine engines for aircraft which use propellers to provide propulsion have blade angle control systems to control pitch angles of blades of the propeller. The blade angle control system is actuated by hydraulic fluid which is supplied under pressure by a pump. In adverse conditions, for instance upon engine malfunction, it may be require to orient the blades in a feather position to minimize drag caused by the blades and to avoid wind milling of the propeller.

SUMMARY

In one aspect, there is provided a propeller control unit (PCU) comprising: a pitch angle actuator; a valve operable to selectively fluidly connect the pitch angle actuator with a source of oil for controlling pitch angles of blades of a propeller and with a drain line for draining oil out of the pitch angle actuator for feathering the blades; and a bypass line having an inlet hydraulically between the valve and an inlet of the drain line, the bypass line having an outlet hydraulically between the inlet of the drain line and an outlet of the drain line.

In another aspect, there is provided a propeller control unit comprising: a pitch angle actuator; a drain line; a valve fluidly connected to the pitch angle actuator, the drain line, and to a source of oil, the valve operable in a first configuration in which oil circulates from the source of oil to the pitch angle actuator through the valve and in which the pitch angle actuator is fluidly disconnected from the drain line, and a second configuration in which fluid communication between the source of oil and the pitch angle actuator via the valve is limited and in which the pitch angle actuator is fluidly connected to the drain line; and a bypass line having an inlet in fluid communication with the pitch angle actuator upstream of the drain line and downstream of the valve, and an outlet connected to the drain line downstream of an inlet thereof.

In yet another aspect, there is provided a method of feathering blades of a propeller of an aircraft engine, comprising: in normal operating conditions of the aircraft engine, exchanging oil between an oil source and a pitch angle blade actuator of the propeller for varying a pitch angle of blades of the propeller; in adverse operating conditions of the aircraft engine, directing the oil from the pitch angle actuator toward a drain line; and bypassing a clog proximate an inlet of the drain line by circulating the oil from the pitch angle actuator within a bypass line rejoining the drain line downstream of the inlet of the drain line.

DESCRIPTION OF THE DRAWINGS

Reference is now made to the accompanying figures in which:

FIG. 4 is a schematic view of the propeller blade angle control circuit of FIG. 2; the circuit shown in a second operating condition;

FIG. 5 is a schematic enlarged view of a bypass line of the circuit of FIG. 3 in accordance with another embodiment;

FIG. 6 is a cross-sectional view of a drain line at a connection location between the drain line and the bypass line; and FIG. 7 is a schematic enlarged view of a bypass line of the circuit of FIG. 3 in accordance with yet another embodiment.

DETAILED DESCRIPTION

Figure 1:
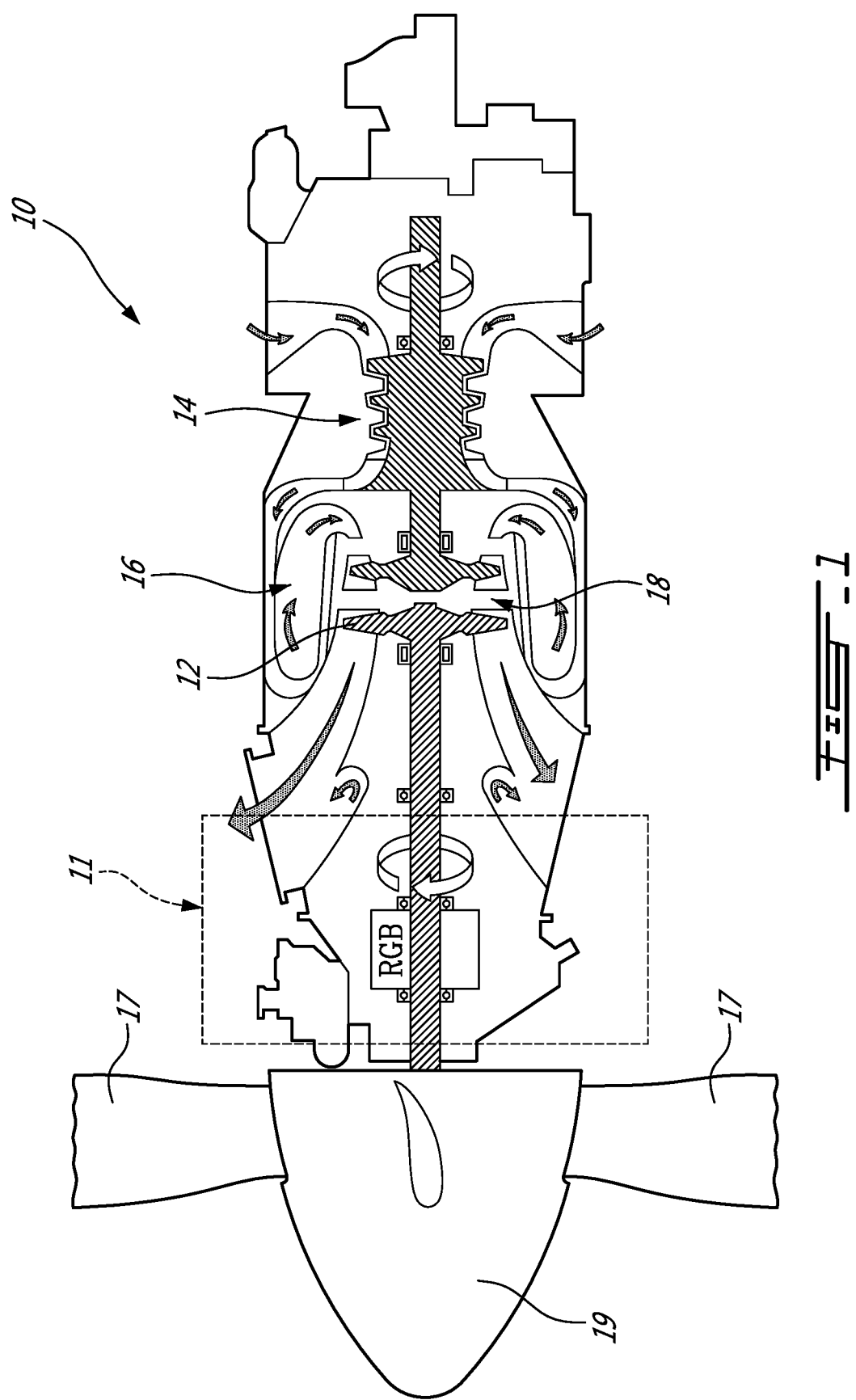
FIG. 1 is a schematic cross sectional view of a gas turbine engine.

FIG. 1 illustrates a gas turbine engine 10 of a type preferably provided for use in subsonic flight, generally comprising in serial flow communication a compressor section 14 for pressurizing ambient air, a combustor 16 in which the compressed air is mixed with fuel and ignited for generating an annular stream of hot combustion gases, and a turbine section 18 for extracting energy from the combustion gases. A low pressure (LP) turbine 12 drives, via a reduction gear box (RGB), a propeller 19 having propeller blades 17 for providing thrust to the aircraft. An oil system 11 is provided for the gas turbine engine 10, and provides lubrication for the rotating components of the gas turbine engine 10, which include bearings for the rotating turbomachinery (e.g. the compressors, turbines, shafts, and gears), the RGB and the propeller control systems, etc.

Figure 2:
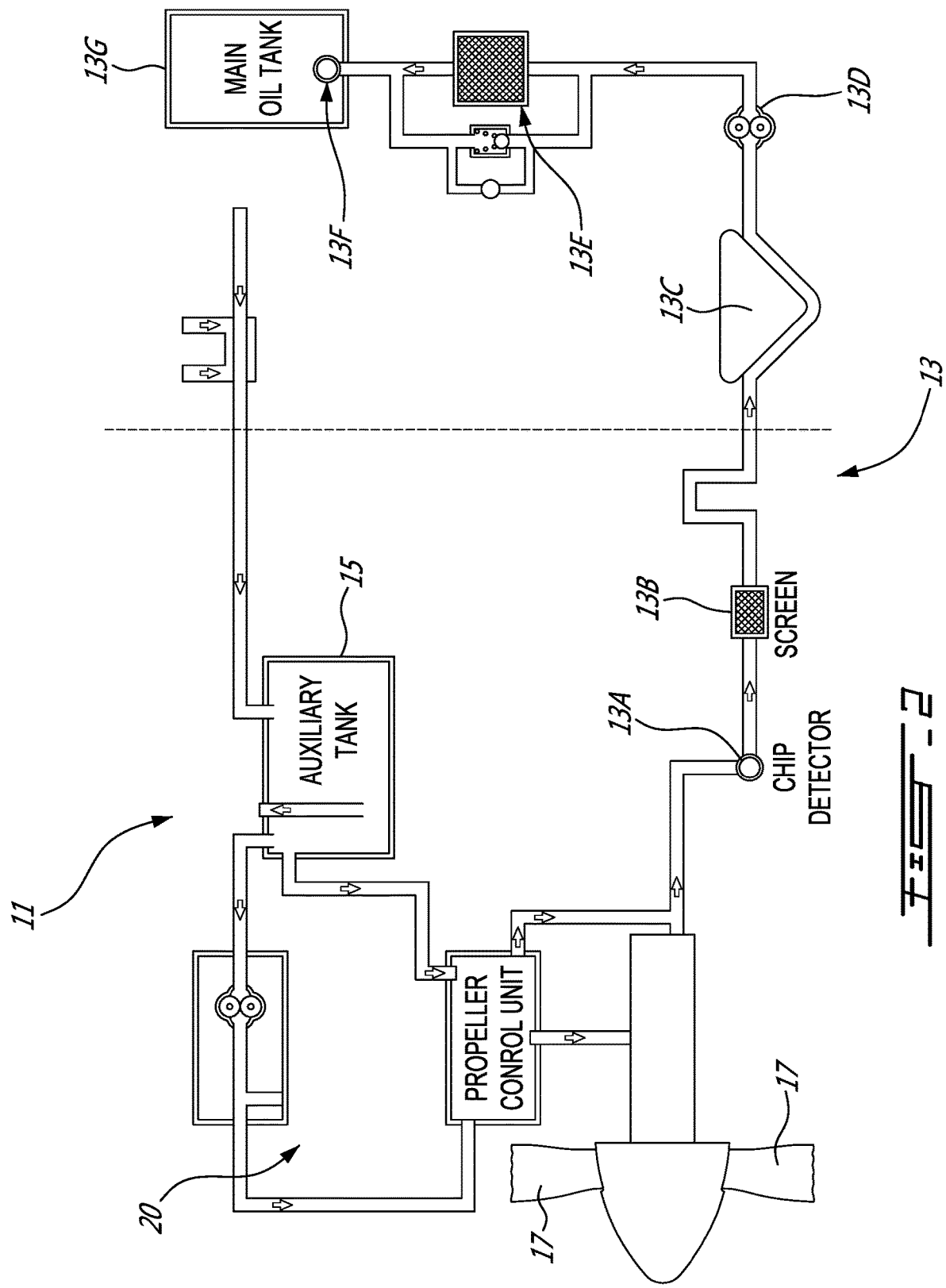
FIG. 2 is a schematic view of an oil system for the gas turbine engine of FIG. 1, the oil system having a propeller blade angle control circuit.

Referring to FIG. 2, the oil system 11 can include any number of components, and any arrangement of components, to provide lubrication to the gas turbine engine 10. One such component, an engine oil return system 13, is shown in the depicted embodiment. The engine oil return system 13 receives used or scavenged oil from the lubricated components of the gas turbine engine, and may filter and/or cool the reclaimed oil. The engine oil return system 13 may pressurize the reclaimed oil for recirculation to the rotating turbomachinery. In the depicted embodiment, the engine oil return system 13 may include a chip detector 13A to detect the presence of unacceptably-large debris in the oil returning from the propeller 19. The oil and any debris may then be filtered with a screen 13B, and may then be subjected to anti-icing procedures at an anti-icing station 13C. A scavenge pump 13D pressurizes the oil and sends it through another filter 13E before passing through another chip detector 13F before being collected in a main oil tank 13G. From the main oil tank 13G, the oil can be pumped with a supply pump to any number of different components of the oil system 11. For example, oil can be pumped from the supply pump to an auxiliary oil tank 15. The engine oil return system 13 can have more, fewer, and/or different components than those schematically depicted or described above.

In the depicted embodiment, the auxiliary oil tank 15 serves as a source of oil for a propeller blade angle control circuit 20. The oil supplied to the propeller blade angle control circuit 20 (or "control circuit 20") provides hydraulic power to the propeller control circuit 20, allowing it to control the pitch of the variable-pitch propeller blades 17. The control circuit 20 may be integrated with, and supplied by, the oil system 11. By being integrated with the oil system 11 of the gas turbine engine, the control circuit 20 is able to use the oil provided by oil system 11 to control the pitch of the propeller blades 17. The oil system 11 therefore provides a lubricating function, and an actuating function by providing hydraulic power.

Figure 3:
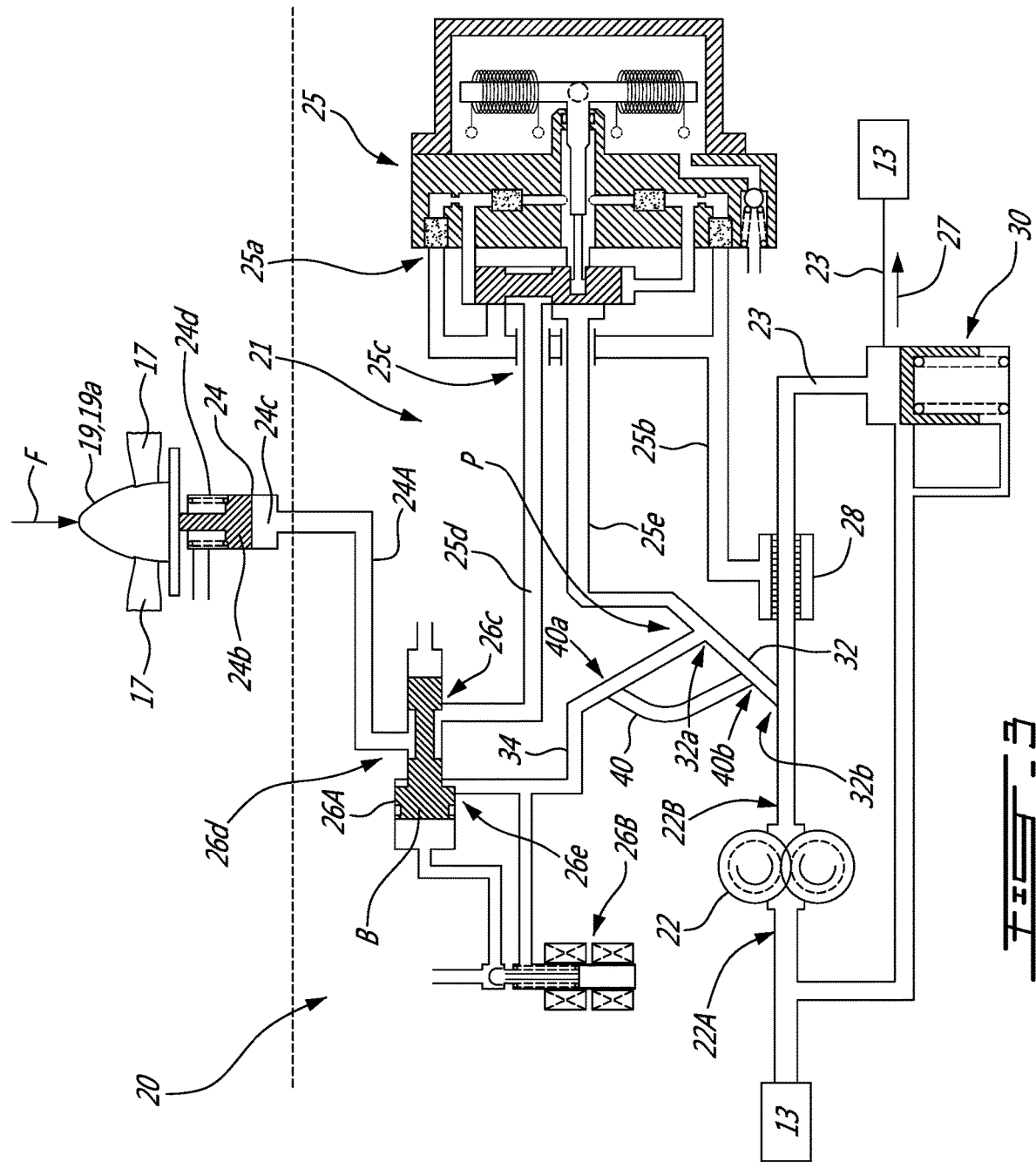
FIG. 3 is a schematic view of the propeller blade angle control circuit of FIG. 2; the circuit shown in a first operating condition.

The control circuit 20 is an assembly of fluid lines, connectors, valves, and other components that supply oil to the mechanisms that change the pitch of the propeller blades 17. In the embodiment of FIG. 3, the control circuit 20 has a propeller control unit 21 to effect changes in the pitch of the propeller blades 17, a pump such as a fixed-displacement pump 22 or the like which provides pressurized oil to the propeller control unit 21, an oil cooling line 23 which helps to divert excess oil to the engine oil return system 13, and a flow regulator 30 which modulates to the flow of oil.

The propeller control unit 21 modulates the supply of oil that is used to modify the angle of the propeller blades 17. It can thus have any suitable component, and any suitable arrangement of components, to achieve this functionality. More particularly, the propeller control unit 21 may include different actuators, valves, and other components to adjust the angle of the propeller blades 17. In the depicted embodiment, the propeller control unit 21 has a propeller pitch change actuator 24 which can effect fine and coarse changes in propeller blade 17 pitch. The pitch change actuator 24 may be located within a dome 19a of the propeller 19. The propeller control unit 21 also has a servo valve 25 or the like which controls the pressure of the oil supplied to the pitch change actuator 24. The propeller control unit 21 also has a feather valve 26A supplied with oil by the servo valve 25, and a feather solenoid 26B. The expression "feather" used as a moniker may refer to a feathering action that may be caused with the propeller blades 17. Any appropriate type of valve may be used therefor. The propeller control unit 21 can have more, fewer, and/or different components than those depicted or described above.

The fixed-displacement pump 22 outputs a substantially constant flow rate of oil to the propeller control unit 21. The pump 22 is therefore located within the control circuit 20 upstream of the propeller control unit 21, and acts as a dedicated source of constant hydraulic power. It is typically sized to provide sufficient hydraulic power to satisfy the largest loads of the propeller control unit 21. The pump 22 is supplied with oil from a component of the oil system 11, such as from the engine oil return system 13.

Still referring to FIG. 3, the oil cooling line 23 is a return line which sends excess oil from the pump 22 to the engine oil return system 13. The oil cooling line 23 can therefore be any hose, tube, pipe, or other similar conduit that extends from an outlet 22B of the pump 22 to the engine oil return system 13. It will be appreciated that the oil cooling line 23 may be physically spaced from the outlet 22B of the pump 22 provided that it is fluid communication therewith to receive oil therefrom.

In allowing excess oil to be diverted away from the pump 22 and propeller control unit 21, the oil cooling line 23 defines a leakage path 27 that leads to the engine oil return system 13. "Excess" oil is oil that is supplied by the fixed-displacement pump 22 but that is not required by the propeller control unit 21. Excess oil is typically available during steady-state operation of the propeller 19 (e.g. flight idle, ground idle, etc.), when there is no need to change the pitch of the propeller blades 17. Rather than returning this relatively hot excess oil to an inlet 22A of the pump 22, as is done in some conventional blade angle control systems, the oil cooling line 23 allows the excess oil to be diverted, directly or indirectly, to the engine oil return system 13 where it can be cooled using any of the techniques used to cool the oil being returned from other parts of the oil system 11 (e.g. air-oil heat exchanger, fuel-oil heat exchanger, circulation, etc.). The oil cooling line 23 therefore helps to divert relative hot oil away from the pump 22, thereby reducing the likelihood of damage to the pump 22 caused by overheating.

Still referring to FIG. 3, the flow regulator 30 governs the amount of oil that is leaked along the leakage path 27 to the engine oil return system 13. The flow regulator 30 is located between the pump 22 and the propeller control unit 21. In the depicted embodiment, the flow regulator 30 is shown downstream of the pump 22, downstream of a wash screen 28, and upstream of the servo valve 25 of the propeller control unit 21. Other configurations are possible. The flow regulator 30 is fluidly connected to the oil cooling line 23, and is operable between an open position and a closed position to selectively allow access to or block, respectively, the leakage path 27 defined by the oil cooling line 23 that leads to the engine oil return system 13.

In the open position, the flow regulator 30 allows access to the leakage path 27 and directs oil through the oil cooling line 23 and along the leakage path 27 toward the engine oil return system 13 so that the oil can be cooled. In this position, where oil is diverted along the leakage path 27, the flow regulator 30 regulates the pressure of the oil supplied to the propeller control unit 21 and diverts excess oil toward the engine oil return system 13. The flow regulator 30 will typically, but not exclusively, operate in the open position during steady-state operation of the propeller 19. During steady-state operation, there is less of a demand from the pitch change actuator 24 responsible for changing the angle of the propeller blades 17. Therefore, "steady-state" refers to relatively little or no demand for hydraulic power from the downstream propeller control unit 21. A cooling oil flow diversion can thus be provided by the flow regulator 30 during steady-state operation.

In the closed position, the flow regulator 30 blocks access to the leakage path 27. Oil is thus instead directed entirely toward the propeller control unit 21 to effect changes in the angle of the propeller blades 17. In this position, where oil is prevented from being diverted along the leakage path 27, an increased portion if not substantially all of the hydraulic power supplied by the pump 22 is available for the propeller control unit 21 to make the required changes in propeller blade 17 pitch. This is in contrast to some conventional blade angle control systems, which allow leaking flow back to the engine oil return even during high load manoeuvres. The flow regulator 30 will typically, but not exclusively, operate in the closed position during transient operation of the propeller 19. During transient operation, there is a relatively high demand for hydraulic power. Some examples of transient flow regimes include accommodating for large changes in engine power, moving the engine into or out of reverse, or feathering or unfeathering the propeller 19. Therefore, "transient" refers to relatively high demand for hydraulic power from the downstream propeller control unit 21.

Still referring to FIG. 3, in normal operating conditions, the servo-valve 25 receives oil from an oil source, which may correspond to the oil return system 13. The oil circulates from the oil return system 13 to an inlet 25a of the servo-valve 25 via a servo-valve inlet line 25b. The servo-valve controls the pressure of the oil that is distributed to the pitch angle actuator 24. The servo-valve 25 outputs the oil via an outlet 25c and directs the oil via a feeding line 25d to a first port 26c of the feather valve 26a. Since the feather valve 26a is in the first configuration, it allows the oil to circulate from the servo-valve 25 to the pitch angle actuator 24 via an actuator line 24a.

The pitch angle actuator 24 may include a piston 24b that moves within an actuator cavity 24c of the pitch angle actuator 24. On the opposite side of the piston 24b, a biasing member 24d, such as a spring, may be used to counteract the force of the oil received in the pitch angle actuator 24. In the depicted embodiment, the biasing member 24d is configured to push the blades 17 of the propeller in a feather position when no oil is received within the actuator cavity 24c. In other words, upon a malfunction of, for instance, the oil system or the engine 10, oil may have to be expelled from the pitch angle actuator 24 to allow the spring to push the piston 24b in a baseline position in which the blades 17 are in the feather position. If there is a malfunction in the engine and/or in the servo-valve, it may be required to bring the blades in the feathering position for safety purposes. Therefore, oil that is contained in the actuator cavity 24c may have to be expelled out of said cavity 24c to be able to bring the blades 17 in the feathering position.

The feather position of the blades 17 corresponds to a position in which an angle of attack defined between the blades 17 and an incoming flow F is such that there is no lifting force created by the incoming flow F on the blades 17. In other words, when the blades 17 are in a feathering position, the blades 17 offer a reduced or minimum drag to the incoming flow F and are in a position that may not result in the incoming flow F from inducing rotation of the propeller. The feathering position is typically used where there is an engine shutdown when the aircraft is flying. Having the blades 17 in the feathering position may prevent the incoming flow F from creating a wind-milling effect of the propeller which might damage the engine 10 when the engine is not operational.

In normal operating conditions, it may be required to change the quantity of oil that is contained within the cavity 24c to be able to dynamically change the angle of attack of the blades 17 relative to the incoming flow F. To do so, the servo-valve 25 allows the oil to exit the actuator cavity 24c and to circulate back to the servo-valve 25 via the feather valve 26a. More specifically, the oil exits the actuator cavity 24c via the actuator line 24a before it enters a second port 26d of the feather valve 26a. The oil then circulates through the feather valve 26a and exits the feather valve 26a via the first port 26c and is redirected back to the servo-valve 25 via the feeding line 25d. The servo-valve 25 now expels the oil to the oil system 13 via an output line 25e. The oil that is expelled out of the servo-valve 25 via the output line 25e is circulated into a drain line 32. The drain line 32 has an inlet 32a fluidly connected to an outlet of the output line 25e of the servo-valve 25 and has an outlet 32b that may be fluidly connected to the oil system 13 or to any other suitable location, such as a scavenge port.

The drain line 32 provides a passage for oil pressure drainage for propeller angle increase. This may be required for propeller deceleration or performing propeller feather in normal propeller operation, or for protection from over speed conditions or if transition out from range below minimum blade angle is required in case of unexpected propeller transition below minimum angle.

Referring to FIG. 4, in adverse operating conditions, the feather valve 26a moves from the first position depicted in FIG. 3 to a second position that is shown in FIG. 4. More specifically, a valve body B of the feather valve 26a moves from the first position in which the servo-valve 25 is fluidly connected to the pitch angle actuator 24 to a second position in which fluid flow communication between the pitch angle actuator 24 and the servo-valve 25 is limited. Moreover, in the first position, fluid communication between the pitch angle actuator 24 and a third port 26e of the servo-valve 26a is limited. In the second position of the feather valve 26a, fluid communication between the actuator 24 and the third port 26e of the feather valve 26a is permitted. In the second configuration of the feather valve 26a, the oil that is contained in the cavity 26c of the actuator 24 is able to exit said cavity 26c via an output line 34. The output line 34 has an inlet 34a fluidly connected to the third port 26e of the feather valve 26a and an outlet 34b that is fluidly connected to the inlet 32a of the drain line 32.

However, during prolonged use of the engine 10, one or both of the output line 34 of the feather valve 26a and the output line 25e of the servo-valve 25 may become clogged by metallic particles or any other debris. Typically, a clog may form proximate the inlet 32a of the drain line 32 where a connection point P is located between the output line 34 of the feather valve 26a, the output line 25e of the servo-valve 25 and the drain line 32. Therefore, it might be required to provide an alternative flow path for the oil that needs to be drained out of the cavity 24c of the pitch angle actuator 24.

More specifically, the PCU 21 utilizes one drain line for oil relief for protecting functions and uses the same drain line for propeller angle increase in normal operating conditions. This single line design can be affected with extended utilization by multiple factors, such as contamination build up, by oil flows continuously utilizing the passage. Restriction of oil flow through the passage would change the rate of oil drain that could alter the propeller protecting or governing functions.

In the embodiment shown, a bypass line 40 is provided. The bypass line 40 has connection points located both upstream and downstream of the connection point P between the different lines. In the depicted embodiment, the inlet 40a of the bypass line 40 is connected to the output line 34 of the feather valve 26a upstream of the drain line 32 and the outlet 40b of the bypass line 40 is connected to the drain line 32 downstream of the inlet 32a of the drain line 32. More specifically, the inlet 40a of the bypass line 40 is connected to the output line 34 of the feather valve 26a between the inlet and the outlet 34a, 34b of said output line 34. The outlet 40b of the bypass line 40 is connected to the drain line 32 between the inlet and the outlet 32a, 32b of said drain line 32. In the depicted embodiment, the outlet 40b of the bypass line 40 is located downstream of the connection point P between the output line 34 of the feather valve 26a and the output line 25e of the servo-valve 25.

Referring now to FIGS. 5 and 6, another embodiment of a bypass line is generally shown at 140. In the embodiment shown, a diameter D1 of the bypass line 140 is less than a diameter D2 of both the output line 34 of the feather valve 26a and of the drain line 32. A ratio of a cross-sectional area of the bypass conduit 140 to a cross-sectional area of the drain line 32 may be designed to ensure that oil drainage through the by-pass line 140, in case of blockage of the main drain line 34, is completed within required time that ensures that the propeller feather provides required protection from over speed and inadvertent application of the reverse thrust. A ratio of a distance L1 along the output line 34 of the feather valve 26a from the inlet 140a of the bypass line 140 to the inlet 32a of the drain line 32 may be determined so as to allow the by-pass line 140 to start at the location best fitted for not allowing the oil flowing in drain line 34 entering into the bypass line 140. An outlet of the bypass line 140 may be positioned at the location best fitted for allowing free oil flow into line 32 in case an oil drain is required through the bypass line 140. A ratio of a distance L2 along the drain line 32 from the inlet 32a of the drain line 32 or from the connection point P to the outlet 140b of the bypass line 140 to a diameter D3 of the drain line 140 may be determined in order to allow the by-pass line 140 to start at the location best fitted for not allowing the oil flowing in line 34 entering into the bypass line 140. An outlet of the drain line 140 may be positioned at the location best fitted for allowing free oil flow into line 32 in case an oil drain is required through the line 140. It is understood that the lines may be circular or may have any other suitable cross-section. In a case where the lines are not circular, the hydraulic diameter may be used instead of the diameter.

As shown more distinctly in FIG. 5, the bypass line 140 stems from the output line 34 of the feather valve 26a and extends away therefrom in a direction D; the direction D having an axial component relative to a central axis A of the output line 34 that is oriented opposite a direction of the flow circulating within the output line 34, from its inlet 34a to its outlet 34b. Having the bypass line 140 extending in a direction opposite that of the flow in the output line 34 may allow to limit oil from circulating in the bypass line 140 when the aircraft is operated under the normal operating conditions.

Referring now to FIG. 7, another embodiment of a bypass line is generally shown at 240. In the depicted embodiment, a flow restrictor R is fluidly connected to the bypass line 240. In the present case, the flow restrictor R is a portion 240c of the bypass conduit 240 that has an elevation Z1 relative to a ground G when the aircraft is on the ground that is greater than an elevation Z2 of the inlet 240a of the bypass conduit 240. The flow restrictor R may avoid oil from circulating within the bypass conduit 240 when the propeller is used in normal operating conditions. In other words, the bypass conduit 240 may only be used when there is a clog in the drain line 32 and when it is required to evacuate the oil from the actuator 34. In the embodiment shown in FIG. 7, a diameter D4 of the output line 134 of the feather valve 36 is less than a diameter D5 of the bypass conduit 240.

The bypass line may be designed as to be non-functional in normal operations and may therefore be unaffected by debris present in oil flow. Isolation of the bypass line, which may be a passage in the housing or an external oil tube, may either be achieved by appropriate location of the bypass line vertically or in opposite to the direction of oil flow in drain oil. In order to ensure isolation of the bypass line, oil flow passing in the drain line may require being confirmed as flowing at the pressure not allowing oil filling in the bypass line up to the point resulting in mixing between both oil flows or alternatively, the bypass line may require to be designed with the use of Bernoulli's equations (based on gravity forces) to limit oil flow mixes between oil of drain line and bypass for reducing the possibility of clogging the bypass line in a dormant manner. The bypass line, if sized for greater diameter then the drain oil line, may eliminate the possibility of that line being affected by non-viscous contamination build-up. Once the drain line is clogged, pressure buildup allows the oil to circulate within the bypass line. In case of obstructions in the drain line, the bypass line may provide an alternate passage, unobstructed, that may allow for safe system operation. Introduction of the bypass passage may allow for maintaining required propeller protective functions in a system preventing protection loss due to continuous normal operation, as well as, if incorporated at the passage on the control line, may allow for maintaining required propeller governing functions.

For feathering the blades of the propeller, in normal operating conditions of the aircraft engine, oil is exchanged between the oil source and the pitch angle blade actuator of the propeller for varying the pitch angle of blades of the propeller. In adverse operating conditions of the aircraft engine, the oil is directed from the pitch angle actuator toward a drain line; and a clog proximate the inlet of the drain line is bypassed by circulating the oil from the pitch angle actuator within the bypass line rejoining the drain line downstream of the inlet of the drain line.

In the embodiment shown, oil is limited from circulating in the bypass line in the normal operating conditions. Limiting the oil from circulating in the bypass line may include connecting the bypass line to a location upstream of the drain line via a portion of the bypass line having an elevation relative to a ground greater than that of an inlet of the bypass line. Exchanging the oil between the oil source and the pitch angle blade actuator may include circulating the oil from the servo valve toward the drain line via the output line. Evacuating the oil from the pitch angle actuator may include circulating the oil in the drain line via the valve output line. Bypassing the clog may include diverting the oil out of the valve output line upstream of the outlet of the valve output line and injecting the diverted oil in the drain line downstream of the inlet of the drain line.

Embodiments disclosed herein include:

A. A propeller control unit (PCU) comprising: a pitch angle actuator; a valve operable to selectively fluidly connect the pitch angle actuator with a source of oil for controlling pitch angles of blades of a propeller and with a drain line for draining oil out of the pitch angle actuator for feathering the blades; and a bypass line having an inlet hydraulically between the valve and an inlet of the drain line, the bypass line having an outlet hydraulically between the inlet of the drain line and an outlet of the drain line.

B. A propeller control unit comprising: a pitch angle actuator; a drain line; a valve fluidly connected to the pitch angle actuator, the drain line, and to a source of oil, the valve operable in a first configuration in which oil circulates from the source of oil to the pitch angle actuator through the valve and in which the pitch angle actuator is fluidly disconnected from the drain line, and a second configuration in which fluid communication between the source of oil and the pitch angle actuator via the valve is limited and in which the pitch angle actuator is fluidly connected to the drain line; and a bypass line having an inlet in fluid communication with the pitch angle actuator upstream of the drain line and downstream of the valve, and an outlet connected to the drain line downstream of an inlet thereof.

Embodiments A and B may include any of the following elements, in any combinations:

Element 1: the bypass line is defined in part by a flow restrictor for limiting oil from circulating in the bypass line. Element 2: the flow restrictor is a portion of the bypass line having an elevation relative to a ground greater than that of the inlet of the bypass line. Element 3: the portion of the bypass line has an inverted U-shape. Element 4: the bypass line stems from an output line connected to the valve and to the inlet of the drain line, the bypass line extending from the output line in a direction opposite that of a flow circulating within the output line. Element 5: a servo valve between the source of oil and the valve, an output line fluidly connecting the servo valve to the inlet of the drain line, the bypass line bypassing a connection point between the output line and the inlet of the drain line. Element 6: the valve is fluidly connected to the drain line via a valve output line, the bypass line stemming from the valve output line. Element 7: a cross-sectional area of the bypass line is greater than a cross-sectional area of the valve output line.

C. A method of feathering blades of a propeller of an aircraft engine, comprising: in normal operating conditions of the aircraft engine, exchanging oil between an oil source and a pitch angle blade actuator of the propeller for varying a pitch angle of blades of the propeller; in adverse operating conditions of the aircraft engine, directing the oil from the pitch angle actuator toward a drain line; and bypassing a clog proximate an inlet of the drain line by circulating the oil from the pitch angle actuator within a bypass line rejoining the drain line downstream of the inlet of the drain line.

Embodiment C may include any of the following elements, in any combinations:

Element 8: limiting oil from circulating in the bypass line in the normal operating conditions. Element 9: limiting the oil from circulating in the bypass line includes connecting the bypass line to a location upstream of the drain line via a portion of the bypass line having an elevation relative to a ground greater than that of an inlet of the bypass line. Element 10: exchanging the oil between the oil source and the pitch angle blade actuator includes circulating the oil from a servo valve toward the drain line via an output line, and wherein evacuating the oil from the pitch angle actuator includes circulating the oil in the drain line via a valve output line, bypassing the clog includes diverting the oil out of the valve output line upstream of an outlet of the valve output line and injecting the diverted oil in the drain line downstream of the inlet of the drain line.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A propeller control unit (PCU) comprising:
a servo valve having a servo valve inlet hydraulically connected to a source of oil, a first servo valve outlet, and a second servo valve outlet;
a servo valve output line hydraulically connected to the second servo valve outlet;
a pitch angle actuator;
a valve operable to selectively fluidly connect the pitch angle actuator with the source of oil via the first servo valve outlet for controlling pitch angles of blades of a propeller and with a drain line via a valve output line for draining oil out of the pitch angle actuator for feathering the blades, the valve output line extending from a valve outlet of the valve and leading to an oil return system, the servo valve output line hydraulically connected to the valve output line at a connection point, the drain line extending from the connection point and leading to the oil return system; and
a bypass line having an inlet hydraulically connected to the valve output line between the valve outlet and an inlet of the drain line upstream of the connection point, the bypass line having an outlet hydraulically connected to the drain line between the inlet of the drain line and an outlet of the drain line downstream of the connection point.

2. The PCU of claim 1, wherein the bypass line is defined in part by a flow restrictor for limiting oil from circulating in the bypass line.

3. The PCU of claim 2, wherein the flow restrictor is a portion of the bypass line having an elevation relative to a ground greater than that of the inlet of the bypass line.

4. The PCU of claim 3, wherein the portion of the bypass line has an inverted U-shape.

5. The PCU of claim 1, wherein the bypass line stems from the valve output line connecting the valve to the inlet of the drain line, the bypass line extending from the valve output line in a direction opposite that of a flow circulating within the valve output line.

6. The PCU of claim 1, wherein the bypass line bypasses the connection point between the servo valve output line and the valve output line.

7. The PCU of claim 1, wherein the valve is fluidly connected to the drain line via the valve output line, the bypass line stemming from the valve output line.

8. The PCU of claim 7, wherein a cross-sectional area of the bypass line is greater than a cross-sectional area of the valve output line.

9. A propeller control unit (PCU) comprising:
a servo valve having a servo valve inlet hydraulically connected to a source of oil, a first servo valve outlet, and a second servo valve outlet;
a servo valve output line hydraulically connected to the second servo valve outlet;
a pitch angle actuator;
a drain line;
a valve fluidly connected to the pitch angle actuator, to the drain line via a valve output line, and to a source of oil via the first servo valve outlet, the valve operable in a first configuration in which oil circulates from the source of oil to the pitch angle actuator through the valve and through the servo valve and in which the pitch angle actuator is fluidly disconnected from the drain line, and a second configuration in which fluid communication between the source of oil and the pitch angle actuator via the valve is limited and in which the pitch angle actuator is fluidly connected to the drain line via the valve output line, the valve output line extending from a valve outlet of the valve and leading to an oil return system, the servo valve output line hydraulically connected to the valve output line at a connection point, the drain line extending from the connection point and leading to the oil return system; and
a bypass line having an inlet connected to the valve output line upstream of the drain line, upstream of the connection point, and downstream of the valve, and an outlet connected to the drain line downstream of an inlet of the drain line and downstream of the connection point.

10. The PCU of claim 9, wherein the bypass line is fluidly connected to a flow restrictor for limiting oil from circulating in the bypass line when the PCU is in the first configuration.

11. The PCU of claim 10, wherein the flow restrictor is a portion of the bypass line having an elevation relative to a ground greater than that of the inlet of the bypass line.

12. The PCU of claim 9, wherein the bypass line bypasses the connection point between the servo valve output line and the valve output line.

13. The PCU of claim 11, wherein the portion of the bypass line has an inverted U-shape.

14. The PCU of claim 9, wherein the bypass line stems from the valve output line connecting the valve to the inlet of the drain line, the bypass line extending from the valve output line in a direction opposite that of a flow circulating within the valve output line.

15. The PCU of claim 9, wherein the valve is fluidly connected to the drain line via the valve output line, the bypass line stemming from the valve output line.

16. The PCU of claim 15, wherein a cross-sectional area of the bypass line is greater than a cross-sectional area of the valve output line.

* * * * *